United States Patent [19]
Herbst et al.

[11] 3,880,866
[45] Apr. 29, 1975

[54] 7-AZAINDOLE FUSED HETEROCYCLIC COMPOUNDS

[75] Inventors: David R. Herbst, Wayne; Kurt W. Ledig, Philadelphia, both of Pa.

[73] Assignee: American Home Products Corporation, New York, N.Y.

[22] Filed: Apr. 18, 1973

[21] Appl. No.: 352,375

Related U.S. Application Data

[63] Continuation-in-part of Ser. No. 248,999, May 1, 1972, abandoned.

[52] U.S. Cl...... 260/293.53; 260/295 A; 260/296 P; 424/263; 424/267
[51] Int. Cl............................................ C07d 57/04
[58] Field of Search........ 260/293.53, 295 A, 296 P

[56] References Cited
UNITED STATES PATENTS
3,478,051  11/1969  Houlihan et al. ............... 260/326.12
3,775,420  11/1973  Herbst et al. ................... 260/293.53

OTHER PUBLICATIONS
Wawzonek et al., J. Med. Chem. 8 (2), 265-7 (1965).
Herbst et al., J. Med. Chem. 9(6), 864-8 (1966).
Shiroyan et al., Arm. Khim. Zh. 21, 44-50 (1968); Chem. Abstracts 69:868483 (1968).
Shiroyan et al., Arm. Khim. Zh. 21, 1025-33 (1968);
Chem. Abstracts 71: 1128362 (1969).

*Primary Examiner*—G. Thomas Todd
*Attorney, Agent, or Firm*—David E. Frankhouser

[57] ABSTRACT

Compound of the formulae:

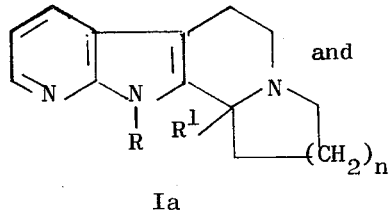

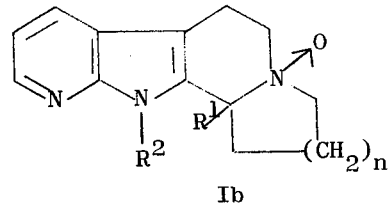

where R is hydrogen, alkyl of from 1 to 5 carbon atoms, or allyl; $R^1$ is methyl, ethyl, or n-propyl; $R^2$ is alkyl of from 1 to 5 carbon atoms or allyl; and $n$ is 1 or 2, or the pharmacologically acceptable acid addition salts thereof have analgesic activity.

34 Claims, 1 Drawing Figure

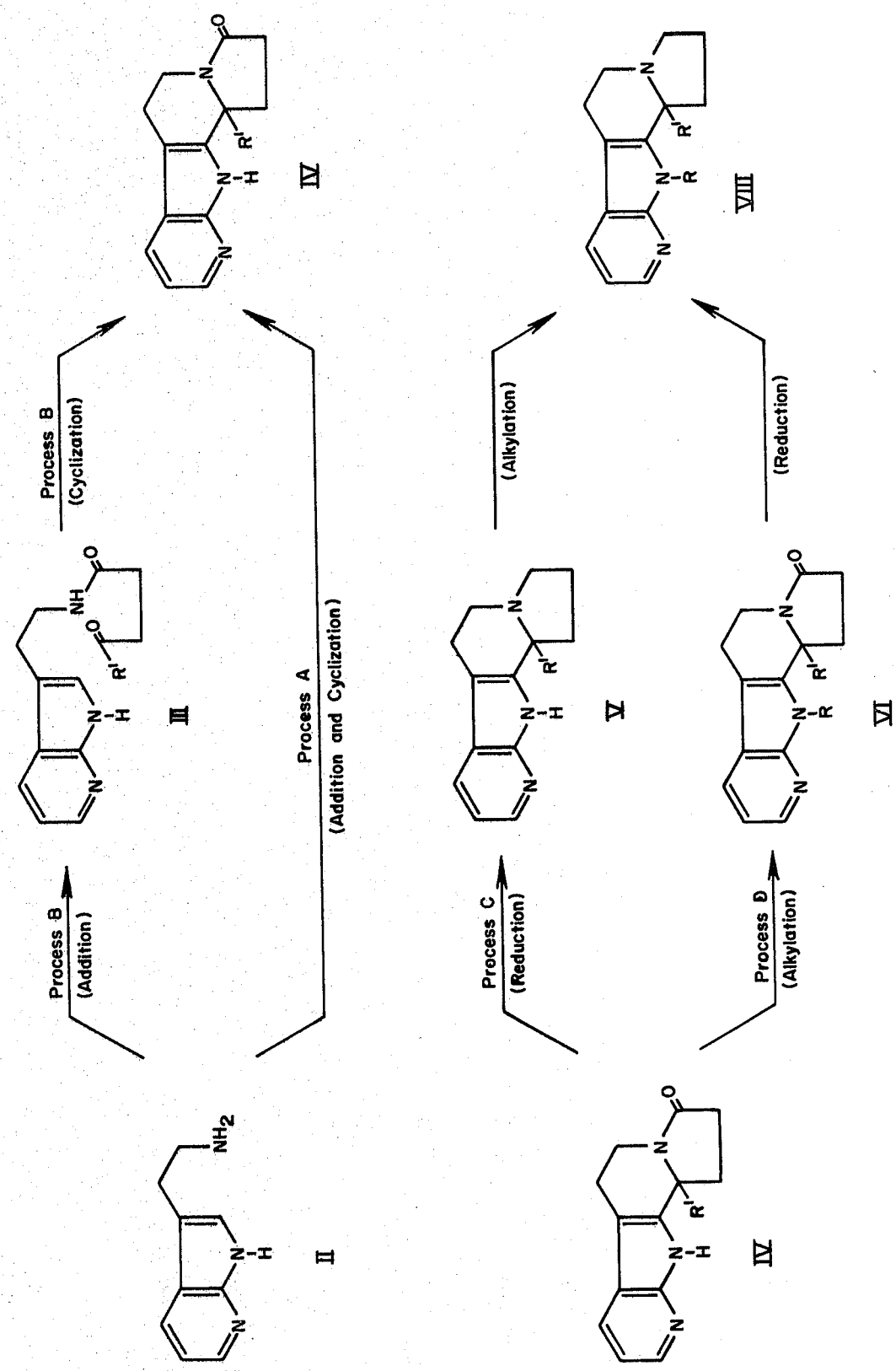

7-AZAINDOLE FUSED HETEROCYCLIC COMPOUNDS

This application is a continuation-in-part of application Ser. No. 248,999, filed May 1, 1972, now abandoned.

BACKGROUND OF THE INVENTION

This invention relates to compounds classified in the art of chemistry as substituted 2,3,5,6,11,11b-hexahydro-1H-pyrido[3',2':4,5]pyrrolo[3,2-g]indolizines and 1,2,3,4,6,7,12,12b-octahydropyrido[3',2':4,5]pyrrolo[2,3-a]quinolizines, to intermediates thereto, to methods for using such compounds, and to pharmaceutical compositions thereof.

In Herbst et al., *J. Med. Chem.*, 9, 864 (1966) the compound 2,3,5,6,11,11b-hexahydro-11-methyl-1H-indolizino[8,7-b] indole is disclosed. In U.S. Pat. No. 3,478,051, there are disclosed compounds described as 2,3,5,6,11,11b-hexahydro-11b-alkyl (and phenyl)-3H-indolizino[8,7-b]indoles and the 3-keto derivatives thereof, and the 1,2,3,4,6,7,12,12b-octahydro-12b-alkyl (and phenyl)-indolo[2,3-a]quinolizines, and the 4(1H)-keto derivatives thereof.

SUMMARY OF THE INVENTION

The invention sought to be patented in a principal composition aspect resides in the concept of a chemical compound of the formulae:

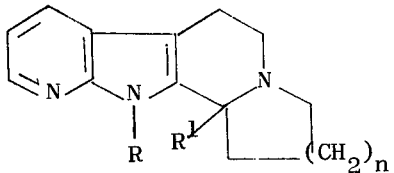

Ia and

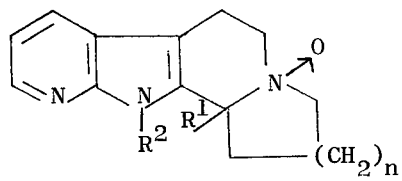

Ib wherein R is hydrogen, alkyl of from 1 to 5 carbon atoms, or allyl; $R^1$ is methyl, ethyl, or n-propyl; $R^2$ is alkyl of from 1 to 5 carbon atoms or allyl; and $n$ is 1 or 2, and the pharmacologically acceptable acid addition salts thereof.

The tangible embodiments of the principal compositions represented by Formula Ia possess the inherent general physical properties in the free base form of being colorless oils or solids, substantially insoluble in water and generally soluble in organic solvents such as benzene, methanol, chloroform, and acetone. In the form of their acid addition salts they are generally white solids, appreciably soluble in water and methanol. The compounds represented by Formula Ib as their acid addition salts are solids and are substantially soluble in water and methanol.

Examination of compounds produced according to the hereinafter described process reveals upon infrared, ultraviolet, and nuclear magnetic resonance spectrographic analysis, spectral data confirming the molecular structure hereinbefore set forth. The aforementioned physical characteristics taken together with the nature of the starting materials, the elemental analyses, and the mode of synthesis, positively confirm the molecular structure hereinbefore set forth.

The tangible aspects of the principal compositions represented by Formula Ia and Formula Ib possess the inherent applied use characteristics of exerting analgesic effects in warm-blooded animals, as evidenced by pharmacological evaluation in standard test procedures.

The invention sought to be patented in a second composition aspect resides in the concept of a chemical compound of the formula:

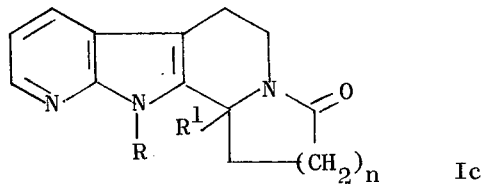

Ic wherein R is hydrogen, alkyl of from 1 to 5 carbon atoms, or allyl; $R^1$ is methyl, ethyl, or n-propyl; and $n$ is 1 or 2; and the acid addition salts thereof.

The tangible embodiments of the compositions represented by Formula Ic possess the inherent general physical properties in the free base form of being colorless oils or solids, substantially insoluble in water, and generally soluble in organic solvents such as chloroform and tetrahydrofuran. In the form of their acid addition salts they are generally white solids, appreciably soluble in water and methanol.

Examination of compounds produced according to the hereinafter described process reveals upon infrared, ultraviolet, and nuclear magnetic spectrographic analysis, spectral data confirming the molecular structure hereinbefore set forth. The aforementioned physical characteristics taken together with the nature of the starting materials, the elemental analyses, and the mode of synthesis, positively confirm the structures of the compositions sought to be patented.

The compounds of Formula Ic possess the inherent applied use characteristics of being intermediates for the preparation of the analgesic compounds of Formula Ia or Formula Ib.

The invention sought to be patented in a third composition aspect resides in the concept of a composition suitable for administration to a warm-blooded animal comprising:

a. a compound of the formulae:

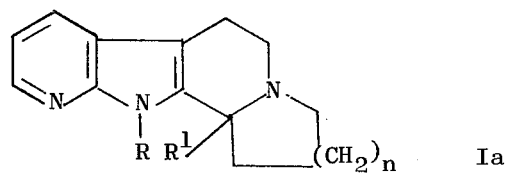

Ia and

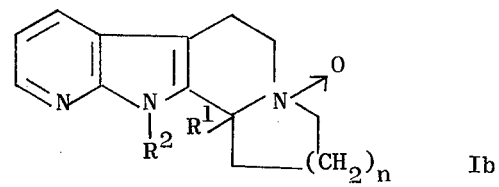

Ib wherein R is hydrogen, alkyl of from 1 to 5 carbon atoms, or allyl; R¹ is methyl, ethyl, or n-propyl; R² is alkyl of from 1 to 5 carbon atoms or allyl; and n is 1 or 2, or the pharmacologically acceptable acid addition salts thereof; and b. a pharmaceutically acceptable carrier.

The invention sought to be patented in a process aspect resides in the concept of a method for producing analgesia in warm-blooded animals which comprises administering to a warm-blooded animal in need thereof, an amount sufficient to produce analgesia in said warm-blooded animal of a compound of the formulae:

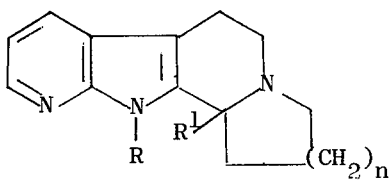

Ia and

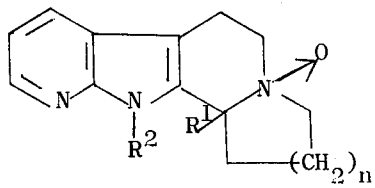

Ib wherein R is hydrogen, alkyl of from 1 to 5 carbon atoms, or allyl; R¹ is methyl, ethyl, or n-propyl; R² is alkyl of from 1 to 5 carbon atoms or allyl; and n is 1 or 2, or the pharmacologically acceptable acid addition salts thereof.

DESCRIPTION OF THE DRAWING

In describing the invention herein, reference will be made to the annexed Drawing, which illustrates schematically the reaction sequence for preparing the 2,3,-5,6,11,11b-hexahydro-1H-pyrido[3',2':4,5]pyrrolo[3,2-g]indolizines, the compounds of Formula Ia, wherein n is 1 and R and R¹ have the meanings hereinbefore defined.

DESCRIPTION OF THE PREFERRED EMBODIMENTS

Referring now to the Drawing, wherein the compounds are assigned Roman numerals for identification, in Process A, 7-azatryptamine (II) is treated with a keto acid of the formula:

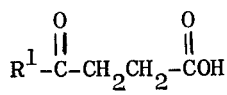

wherein R¹ is lower alkyl to afford the amino amide intermediate (IV). The methods employed in said process are similar to those described by S. Wawzonek and J.D. Nordstrom, J. Med. Chem. 8, 265 (1965). The same intermediate (IV) can be made alternatively in Process B in two steps by first contacting 7-azatryptamine (II) with an enol lactone of the formula:

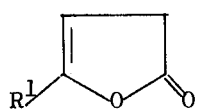

to yield the keto amide intermediate (III) and then cyclizing said intermediate. The first step in Process B is carried out by a method similar to that described by F. Shiroyan, in *Arm. Khim. Zh.*, 20, 649 (1967). The cyclization is effected by heating the keto amide intermediate (III) in the presence of mineral acid, for instance hydrogen chloride in isopropanol.

The aminoamide intermediate (IV) is converted to the amine (V), in Process C by reducing the amide carbonyl with a reducing agent such as lithium aluminum hydride. The reduction is performed in a non-reactive solvent, such as tetrahydrofuran, at reflux temperature. Alternatively, the reduction can be carried out by converting the ketoamide to a thioamide by contacting with phosphorous pentasulfide in a non-reactive solvent and then reducing the thioamide with Raney nickel using methods similar to those described in U.S. Pat. No. 3,454,583.

$N_{ind}$-Alkylation of the amine (V) affords the product (VII). The alkylation is accomplished by contacting the amine (V) with a base in a non-reactive solvent, e.g. sodium hydride in dimethyl formamide, and then adding an alkylating agent, e.g. a lower alkyl halide or tosylate, at a temperature ranging from about 0° to about 100°C. When R is lower alkyl, the product (VII) may also be prepared in Process D by $N_{ind}$-alkylation of the aminoamide (IV) followed by reduction of the amid carbonyl function using the reduction methods heretofore described.

It will be appreciated that the indolic nitrogen atom of 7-azatryptamine may be substituted with an appropriate alkyl group (R). Such substituted compounds may be employed as starting materials in Process A of the above-described method to give the aminoamide (VII) directly without the need of the alkylation step (Process D).

The amine (V) may also be prepared by the Fischer indole synthesis by reacting a keto compound of the formula:

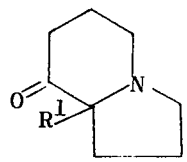

VIII wherein R¹ is methyl, ethyl, or n-propyl, with 2-hydrazinopyridine or an N-(alkyl)-N-(2-pyridyl)hydrazine. The keto compound (VIII) may be synthesized according to the following methods:

A 2-(alkyl)proline (IX) is first converted to its methyl ester (X) using standard procedures, e.g. thionyl chloride and methanol. If the ester is obtained as an acid addition salt (which will be the case when the thionyl chloride-methanol method is employed), it must be neutralized with a strong base, e.g. triethylamine, to afford the free amine. The free amino ester (X) is then N-alkylated with an appropriate methyl 4-halobutyrate to afford a diester (XI) which is then cyclized in the presence of a base, e.g. sodium methoxide, to yield in situ a β-keto ester compound which is extracted into water. The water extract containing said intermediate is acidified to about pH 1 and heated, whereupon hydrolysis and decarboxylation takes place to give the keto compound (VIII).

The 1,2,3,4,6,7,12,12b-octahydropyrido[3′,2′:4,5]pyrrolo[2,3-a]quinolizine compounds of Formula Ia (i.e. those where n is 2) may be prepared as in Process A or Process B as previously described, from 7-azatryptamine, or an $N_{ind}$-(alkyl) substituted 7-azatryptamine, and a keto acid:

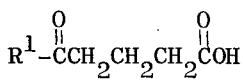

or an enol lactone:

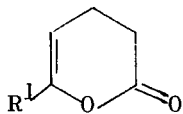

where $R^1$ is methyl, ethyl, or n-propyl.

The cyclic intermediate:

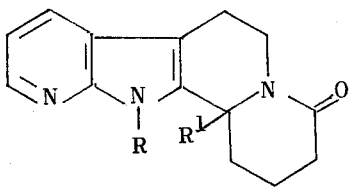

thus formed is converted to a compound of Formula (Ia) where n is 2, using the reduction and $N_{ind}$ alkylation procedures hereinbefore described, or obvious modifications thereof.

The compounds of Formula Ia or Ic as obtained in the above-described processes and appropriate intermediates thereto may be isolated and purified in a conventional manner. It is furthermore appreciated that in the various processes described above, factors such as solvents and temperatures are not critical. In general, the solvent selected must be reaction-inert, i.e. it must not interfere with the course of the reaction, and be such that the reactants are soluble therein. When a compound of Formula Ia or Ic is obtained as an acid addition salt, it may be converted to the free base by conventional methods, such as by dissolving the salt and treating the solution with sodium hydroxide. When a compound of Formula Ia or Ic is obtained as a free base, it may be converted to an appropriate acid addition salt by dissolving the base and treating the solution with the desired acid.

The starting materials for the above-described synthetic procedures are described in the literature or may be prepared by procedures well known in the art. 7-Azatryptamine is described by M. Robinson and B. Robinson, J. Am. Chem. Soc., 78, 1247 (1956); French Patent No. 1,261,179; British Pat. No. 897,988; and U.S. Pat. No, 3,354,174. 2-Methylproline is described by K. Kariyone, Chem. and Pharm. Bull. (Japan) 8, 1110 (1060) and in U.S. Pat. No. 3,422,110.

The N-oxides of Formula Ib, where $R^1$, $R^2$ and n are as hereinbefore defined, are prepared by oxidation of a compound of the formula:

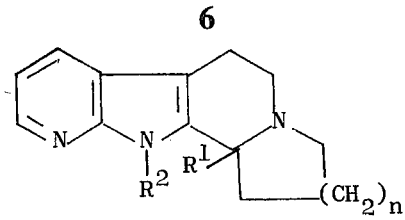

where $R^2$ is alkyl of from 1 to 5 carbon atoms or allyl; $R^1$ is methyl, ethyl, or n-propyl, or n is 1 or 2; with an organic peroxyacid. Suitable peroxyacids are peroxyformic, peroxyacetic, peroxytrifluoroacetic, m-chloroperoxybenzoic, peroxyphthalic, and the like. m-Chloroperoxybenzoic acid is, however, preferred. The peroxyacid may be either preformed or prepared in situ by the interaction of hydrogen peroxide with an appropriate carboxylic acid, as described in Fieser and Fieser, "Reagents for Organic Synthesis, "John Wiley, 1967, pp. 457–465.

In general, the oxidation reaction is performed in a reaction-inert organic solvent at a temperature ranging from about −5° to about 50°C for a period of time up to 2 hours. The preferred temperature range is from about −5° to about 5°C, and the preferred solvent is tetrahydrofuran. The $N_b$-oxide derivative will form an acid addition salt with the carboxylic acid formed by the decomposition of the peroxyacid selected. The salt formed thereby may be recovered, or it may be converted to a salt containing an anion other than that contained in the salt formed initially by contacting the salt with an organic or mineral acid having an acid strength greater than that of the carboxylic acid to which the $N_b$-oxide derivative was initially bound. For instance, when the oxidizing agent is m-chloroperoxybenzoic acid, the $N_b$-oxide derivative combines with m-chlorobenzoic acid. The m-chlorobenzoic acid addition salt can be contacted with hydrogen chloride to afford the hydrochloride salt.

If desired, the $N_b$-oxide derivative as the acid addition salt may be converted to the corresponding free $N_b$-oxide derivative by contacting the salt with an appropriate base. If the neutralization is performed in a suitable, pharamaceutically acceptable solvent and if no toxic products are produced, the solution of the $N_b$-oxide free base can be used directly for the biological purposes herein described. For example, the salt may be dissolved in water and treated with sodium hydroxide in an amount sufficient to generate the base.

Since the compounds of the invention possess an asymmetric carbon atom, optical enantiomorphs are possible, and the compounds of the invention may be the pure enantiomorphs or mixtures of such enantiomprphs, such as the racemates. The products of the invention may be obtained in the form of the pure enantiomorphs either by carrying out a resolution at any convenient stage of the synthesis of the compounds or by resolving the desired products. The resolutions may be carried out by methods known in the art. For example, the pure dextro and levo enantiomorphs of 2,3,5,6-,11,11b-hexahydro-11,11b-dimethyl1H-pyrido[3′,2′:4,5]pyrrolo[3,2-g]indolizine are obtained by treating the racemate with 2,3-dibenzoyl-2(R):3(R)-tartaric acid. The salt of the l-isomer is isolated by crystallization, and the l-isomer in its free base form is obtained by treating the salt with a suitable strong base. The d-isomer is isolated by treating the base obtained upon basifying the motor liquor from the above crystallization step, with 2,3-dibenzoyl- 2(S):3(S)-tartaric acid, crystallizing the salt formed thereby, and treating the salt with a suitable strong base. If desired, the resolved bases can be converted to the corresponding acid salts by conventional procedures. The pure enantiomorphs can be subjected to oxidation with a peroxyacid to give the dextro- or levoform of 2,3,5,6,11,11b-hexahydro-11,11b-dimethyl-1H-pyrido[3',2';4,5]pyrrolo[3,2-g]indolizine 4-oxide, dihydrochloride.

The analgesic activity of the compounds of Formula Ia or Ib has been demonstrated in rats according to the method of D'Amour and Smith, J. Pharmacol., 72, 74 (1941), the details of which are given herein in Example XXXII. The compound, 2,3,5,6,11,11b-hexahydro-11,11b-dimethyl-1H-pyrido[3',2': 4,5]pyrrolo[3,2-g]indolizine has been found to be an extremely active analgesic, the potency being about 110 times greater, orally, and about 17 times greater, intramuscularly, than that of morphine.

In practicing the process aspects of inducing analgesia in warm-blooded animals, the effective dosage will vary according to the particular compound being employed, the severity and nature of the pain, and the particular subject being treated.

In general, with large warm blooded animals (about 70 kg body weight) effective results can be achieved by the oral route at a dosage level of from 0.1 to about 30 mg given every 4 hours or as needed. By the intramuscular route, effective results can be achieved at a dosage level of from 0.5 to about 7.5 mg as needed. Therapy should be initiated at lower dosages, the dosage thereafter being increased until the desired analgesia is obtained. For 2,3,5,6,11,11b-hexahydro-11,11b-dimethyl-1H-pyrido[3',2':4,5]pyrrolo[3,2-g]indolizine, a preferred embodiment, the preferred range is 0.1 to 1.0 by the oral route and 0.5 to about 2.0 mg by the intramuscular route.

When employed as analgesic agents, the active substances may be administered alone or in combination with pharmaceutically acceptable carriers, the proportion and nature of which are determined by the solubility and chemical properties of the compound selected, the chosen route of administration, and standard pharmaceutical practice. For example, the compounds of Formula I may be administered orally in solid dosage forms, e.g. capsules, tablets, or powders, or in liquid forms, e.g. solutions or suspensions. The compounds may also be injected parenterally in the form of sterile solutions or suspensions. Solid oral forms may contain conventional excipients, for instance: lactose, succrose, magnesium stearate, resins, and like materials. Liquid oral forms may contain various flavoring, coloring, preserving, stabilizing, solubilizing or suspending agents. Parenteral preparations are sterile aqueous or non-aqueous solutions or suspensions which may contain various preserving, stabilizing, buffering, solubilizing, or suspending agents. If desired, additives, such as saline or glucose may be added to make the solutions isotonic.

For parenteral administration, it is convenient to employ the compounds of the invention in the form of their pharmacologically acceptable acid addition salts, which are water soluble and thus may be readily incorporated into preparations suitable for injection. The salts are prepared by methods well known in the art. Appropriate salts are those formed from both inorganic and organic acids, for example: hydrochloric, hydrobromic, sulfuric, sulfonic, phosphoric, nitric, maleic, fumaric, benzoic, ascorbic, pamoic, succinic, methanesulfonic, acetic, propionic, tartaric, citric, lactic, malic, mandelic, cinnamic, palmitic, itaconic, and benzenesulfonic.

The following examples are illustrative of the processes of the invention. All temperatures are in centigrade.

EXAMPLE I 1,2,5,6,11,11b-Hexahydro-11b-Methyl-3H-Pyrido[3', 2':4,5]Pyrrolo[3,2-g]Indolizin-3-One Method (1):

Butyl cellosolve (70 ml), 2.9 g levulinic acid and 2.0 g 7-azatryptamine [M.M. Robinson and B.C. Robinson, J. Am. Chem. Soc. 78, 1247 (1956); French Pat. No. 1,261,179 -C.A., 57, 2274b (1962); British Pat. No 897,988 - C.A. 57, 12567d (1962)] are refluxed (under $N_2$) for 20 hours and the solvent is removed in vacuo. The residual gum solidifies upon trituration with water-excess aqueous sodium hydroxide and the brown solid is collected, thoroughly washed with water and triturated with ether. Recrystallization (twice) of the crude product from acetone yields 0.7 g title compound, dec. 253°–254°; $\lambda KBr/max$ 3.31 5.97 $\mu$; NMR ($CDCl_3$): $\mu$1.77 (singlet, 11b-methyl), 4.58 (multiplet, C-5 proton) ppm.

Method ((2):

7-Azatryptamine (4.6 g), 3.1 g angelicalactone and 60 ml dry tetrahydrofuran (THF) are refluxed for 1 hour and the solution is chilled at +5° for ca 16 hours. The solids are collected, washed with cold (ca - 70°) THF and thoroughly dried to afford 4.6 g of N-[2-(7-azaindol-3-yl)ethyl]-4-oxovaleramide, m.p. 136°–137°; $\lambda KBr/max$ 3.05, 5.86, 6.11 $\mu$: NMR ($CDCl_3$) $\delta$2.17 (singlet, $COCH_3$), 6.49 (multiplet, amide NH) ppm.

Isopropanol (80 ml), 3.9 g. of N-[2-(7-azaindol-3-yl) ethyl]-4-oxovaleramide and 5 ml 3.2 N HCl/isopropanol solution are refluxed for 3 hours and the reaction mixture then is evaporated to dryness. Successive recrystallizations of the residue from isopropanol, chloroform-ether and isopropanol-methanol provide 1.7 g of the title compound as the hydrochloride salt solvated with 0.2 molecule isopropanol per molecule of salt, dec. 283°–286°; $\lambda_{max}^{KBr}$ 2.95, 4.05, 5.94 $\mu$; NMR (dDMSO): $\delta$1.05 (doublet, J=6 Hz, isopropyl methyl), 1.65 (singlet, 11b methyl), 4.27 (multiplet, C-5 proton) ppm.

The preceding hydrochloride (0.5 g, solvated with isopropanol) is converted to the free base which is recrystallized from acetone and from nitromethane. A 208 mg quantity of material is isolated, and a 101 mg portion is recrystallized from acetone to yield 64 mg title compound, dec. 255°–256°. Taken simultaneously, the product of Method 1 decomposes at 254° while a mixture of the two specimens decomposes at 254°.

The IR, NMR and UV spectra of the two samples are similar exhibiting only very minor differences arising from the presence of differing, trace amounts of solvent.

EXAMPLE II 2,3,5,6,11,11b-Hexahydro-11b-Methyl-1H-Pyrido[3',2':4,5]Pyrrolo[3,2-g]Indolizine Method (1):

To 15 ml methanol at −10° are added, in turn, 3.2 ml thionyl chloride and 5.2 g dl-2-methylproline [K. Kariyone, Chem. and Pharm. Bull. (Japan), 8, 1110

(1960); U.S. Pat. No. 3,422,100] and the solution is kept at ca. 25° for 3 hours and then is refluxed for 2 hours. The solvent is removed and the residue is recrystallized from acetone to provide 3.2 g 2-methyl-2-pyrrolidine-carboxylic acid, methyl ester, hydrochloride, m.p. 95°–96°; $\lambda_{max}^{KBr}$ 3.68, 5.73 $\mu$; NMR (dDMSO): $\delta$1.63 (singlet, 2-methyl), 3.79 (singlet O-methyl) ppm.

A mixture of the 63.0 g salt, prepared as above and 500 ml triethlamine is vigorously stirred for 4 hours and filtered. The filtrate is retained and the solids are triturated three times further with triethyl amine as before. Removal of triethyl amine from the combined filtrates yields 41.0 g crude 2-methyl-2-pyrrolidinecarboxylic acid, methyl ester, $\lambda_{max}^{film}$ 3.00, 5.77 $\mu$.

Acetone (300 ml), 17.1 g 2-methyl-2-pyrrolidinecarboxylic acid, methyl ester, 16.5 g anhydrous potassium carbonate, 18.0 g methyl 4-chlorobutyrate and 19.5 g anhydrous sodium iodide are stirred and refluxed for 48 hours. The reaction mixture is filtered and the filtrates are freed of solvent. Suspension of the residue in ether, filtration and evaporation of ether from the filtrate gives a residue which is distilled to provide 14.0 g of 2-carboxy-2-methyl-1-pyrrolidinebutyric acid, dimethyl ester, b.p. 105°–108°/0.1 mm; $\lambda_{max}^{film}$ 5.75 $\mu$; NMR (CDCl$_3$): $\delta$1.25 (singlet, 2-methyl), 3.65 (singlet, O-methyls) ppm.

| Analysis for | C$_{12}$H$_{21}$NO$_4$: |
|---|---|
| Calculated: | C, 59.24; H, 8.70; N, 5.76. |
| Found: | C, 59.61; H, 8.62; N, 5.76. |

Toluene (400 ml), 8.9 g. sodium methoxide and 33.3 g 2-carboxy-2-methyl-1-pyrrolidinebutyric acid, dimethyl ester are refluxed for 4 hours. The reaction mixture is extracted with water and the combined aqueous extracts (ca 300 ml) are made strongly acidic with concentrated HCl and then are heated on the stem bath. After 12 hours of heating a negative ferric chloride test is observed.

A 20 ml portion of the preceding acidic solution (neg. ferric chloride test) and 2.0 g 2-hydrazinopyridine, hydrochloride, are refluxed for 2 hours and then are evaporated to dryness. The residue and ca. 6 g of polyphosphoric acid are heated during successive one hour periods at 170°, 200°, and 250°. After cooling, the reaction mixture is mixed with ice, basified with aqueous sodium hydroxide and is extracted with ether. The ethereal extracts are washed with brine, dried (magnesium sulfate) and freed of solvent to give an oil which is dissolved in dil. aqueous hydrochloric acid and washed with ether. Basification of the acidic solution, extraction with ether and removal of solvent from the ethereal extracts provide 1.5 g oily base that is chromatographically purified on a column of neutral, activity III alumina. From the chloroform eluates is isolated a crystalline solid which is recrystalized from ether to yield 350 mg title compound, m.p. 199°–200°; $\lambda_{max}^{KBr}$ 3.16 $\mu$; NMR (CDCl$_3$): $\delta$1.65 (singlet, 11b-methyl) ppm. $\mu_{max}^{EtOH\ 95\%}$ 228 ($\epsilon$25,640), 291 ($\epsilon$9,460) m$\mu$; $\lambda_{min}^{95\%EtOH}$ 249 ($\epsilon$690) m$\mu$.

| Analysis for | C$_{14}$H$_{17}$N$_3$: |
|---|---|
| Calculated: | C, 73.97; H, 7.54; N, 18.49. |
| Found: | C, 73.99; H, 7.45; N, 18.41. |

Method (2):

A refluxing and stirred (under N$_2$) suspension of 2.0 g lithium aluminum hydride in 100 ml dry THF is treated slowly with a solution of 4.0 g 1,2,5,6,11,11b-hexahydro-11b-methyl-3H-pyrido[3',2': 4,5]pyrrolo[-3,2-g-]indolizine-3 -one in 200 ml dry THF. Refluxing and stirring are continued for 2 hours longer and the reaction mixture is cooled as 10 ml N NaOH solution are added cautiously with vigorous stirring. The mixture is filtered and the solids are washed thoroughly with boiling THF. Removal of solvent from the combined THF fractions gives a residue which is dissolved in methanol and acidified with excess insopropanolic hydrogen chloride. Dilution of the acidified methanolic solution with acetone and chilling yield a crystalline solid. Recrystallization of this material from methanol-acetone (thrice) provides 1.7 g title compound as a dihydrochloride salt, m.p. 280°–282°; $\lambda_{max}^{KBr}$ 2.99, 4.02 $\mu$; NMR (dDMSO): $\delta$2.02 (singlet, 11b-methyl) ppm; $\lambda_{max}^{95\%\ EtOH}$ 223 ($\epsilon$27,200), 290 ($\epsilon$10,080) m$\mu$; $\lambda_{min}^{95\%EtOH}$ 244 ($\lambda$1,280) m$\mu$.

An aqueous solution of ca. 100 mg of the dihydrochloride salt in water is basified with excess aqueous sodium hydroxide and the solution is extracted with ether. After washing with brine, the ethereal extracts are concentrated to a volume of ca. 5 ml and chilled to provide, after drying, 60 mg title compound, m.p. 200°. Based on the melting point, mixture melting point, thin layer chromatrographic comparisons and IR, NMR and UV spectral data, this product is identical with the diamine prepard by Method (1):

EXAMPLE III 2,3,5,6,11,11b-Hexahydro-11,11b-Dimethyl-1H-Pyrido[3',2':4,5]Pyrrolo[3,2-g]Indolizine Method (1):

To a solution of 8.1 g 1,2,5,6,11,11b-hexahydro-11b-methyl-3H-pyrido[3',2':4,5]pyrrolo[3,2-g]indolizin-3-one in 100 ml dry dimethylformamide (DMF) are added 1.8 g ca. 50% sodium hydride-mineral oil dispersion and the mixture is stirred for one hour. Methyl iodide (4.76 g) in 10 ml dry DMF is added, stirring is continued for 2 hours and the mixture then is freed of solvent (in vacuo). A solution of the residue in dilute aqueous hydrochloric acid is washed with ether and the acidic solution then is made strongly basic and is extracted with chloroform. The chloroform extracts are washed with brine, dried over magnesium sulfate and then the solvent is evaporated. Dissolution of the residual gum in a small amount of methanol, addition of excess isopropanolic hydrogen chloride and ether cause precipitation of a salt which is recrystallized from methanol to give 3.8 g of 1,2,5,6,11,11b-hexahydro-11,11b-dimethyl-3H-pyrido[3',2':4,5]pyrido[3,2-g]indolizin-3-one as a hydrochloride salt bearing 0.25 molecule water per molecule of aminoamide hydrochloride, m.p. 272°–275°; $\lambda_{max}^{KBr}$ 2.96, 4.42, 5.91 $\mu$; NMR (dDMSO): $\delta$1.62 (singlet, 11b-methyl), 3.90 (singlet, 11-methyl), 4.30 (multiplet, C-5 proton) ppm.

Sodium methoxide (0.93 g) is added to a solution of 5.0 g 1,2,5,6,11,11b-hexahydro-11,11b-dimethyl-3H-pyrido[3',2':4,5]pyrrolo[3,2-g]indolizin-3-one, hydrochloride, 0.25 hydrate in 150 ml hot methanol and the mixture is freed of solvent and the residue is thoroughly dried. The solids, suspended in 100 ml dry THF, are added slowly to a refluxing and stirred suspension of 2.5 G lithium aluminum hydride in 100 ml dry THF.

After a 2-hour reflux period, the reaction mixture is cooled, carefully treated with 12.5 ml N NaOH solution and filtered. The solids are thoroughly washed with boiling THF and the solvent is removed from the combined THF fractions. Dissolution of the residue in ether and addition of excess isopropanolic hydrogen chloride afford a precipitate which is collected and recrystallized from methanol to yield 2.50 g of title compound as the dihydrochloride salt, dec. 305°; $\lambda_{max}^{KBr}$ 4.17, 4.90$\mu$; NMR (dDMSO): $\delta$1.98 (singlet, 11b-methyl), 3.87 (singlet, 11-methyl) ppm. $\lambda_{max}^{95\%EtOH}$ 225.5 ($\epsilon$25,600), 290 ($\epsilon$8,970) m$\mu$; $\lambda_{min}^{95\%EtOH}$ 248 ($\epsilon$660) m$\mu$.

Method (2):

To a solution of 1.4 g 2,3,5,6,11,11b-hexahydro-11b-methyl-1H-pyrido[3',2':4,5]pyrrolo[3,2-g]indolizine (See Example II) in 20 ml dry DMF is added 0.33 g of a ca. 50% sodium hydride-mineral oil dispersion and the reaction mixture is stirred for 1 hour (under $N_2$). Methyl iodide (0.96 g) is added and stirring is continued for an additional hour. Several drops of glacial acetic acid are added and the DMF is removed in vacuo. The residue, after dissolution in dilute aqueous HCl, is washed with ether and the acidic solution is made strongly basic and is extracted with ether. Washing of the ethereal extracts with brine, drying (MgSO$_4$) and removal of solvent produce 1.05 g title compound as a gum, NMR (CDCl$_3$): $\delta$1.60 (singlet, 11b-methyl), 3.85 (singlet, 11-methyl) ppm; $\lambda_{max}^{95\%EtOH}$ 230 ($\epsilon$24,850), 292 ($\epsilon$8,610)m$\mu$; $\lambda_{min}^{95\%EtOH}$ 250 ($\epsilon$900) m$\mu$.

A 0.9 g portion of the above base in 50 ml ether is treated with excess isopropanolic HCl. The salt thus formed is washed with ether and thoroughly dried to yield 0.65 g title compound as the dihydrochloride salt, dec. 305°. By IR, NMR and UV spectral comparisons, this product is the same as the salt prepared by Method (1) above.

EXAMPLE IV

11-Ethyl-2,3,5,6,11,11b-Hexahydro-11b-Methyl-1H-Pyrido[3',2':4,5]Pyrrolo[3,2-g]Indolizine Ethylation of 3.2 g of 2,3,5,6,11,11b-hexahydro-11b-methyl-1H-pyrido[3',2':4,5]pyrrolo[3,2-g]indolizine with 0.76 g ca. 50% sodium hydride-mineral oil dispersion and 2.44 g ethyl iodide is conducted in a manner similar to that of Example III, Method 2. Benzene extracts of the basic aqueous fraction are washed with brine, dried (magnesium sulfate) and placed on a 100 g column of neutral, activity III alumina. Elution of the column with 3/7 ether-benzene yields 2.2 g title compound as a gum; NMR (CDCl$_3$): $\delta$1.48 (triplet, J=7 Hz) and 1.59 (singlet), overlapping (N—CH$_2$CH$_3$ and 11b-CH$_3$), 4.33 (quartet, J=7, Hz, N-CH$_2$—) ppm.

A 2.0 g portion of the above base is treated with isopropanolic hydrogen chloride. Recrystallization of the salt thus formed from acetonitrile gives 0.65 g title compound as the dihydrochloride salt, dec. 244°–246°.

EXAMPLE V

11b-Ethyl-1,2,5,6,11,11b-Hexahydro-3H-Pyrido[3',2':4,5]Pyrrolo[3,2-g]Indolizin-3-One Butyl cellosolve (100 ml), 16.12 g 7-azatryptamine and 15.62 g 4-oxohexanoic acid are heated with removal of the volatiles until a distillation temperature of ca. 170° is attained and the solution then is refluxed for 19.5 hours. The gum remaining after removal of the solvent (in vacuo) is dissolved in dilute aqueous HCl, washed with ether and reprecipitated with excess aqueous sodium hydroxide. Extraction of the precipitate with methylene chloride, washing of the organic solution with water, drying (sodium sulfate) and removal of solvent afford 24.75 g brown foamy gum.

The preceding gum (24.55 g), 200 ml isopropanol and 100 ml ca 2.57 N isopropanolic hydrogen chloride are refluxed for 16 hours, freed of solvent and the residue is dissolved in water. After washing with ether, the acidic, aqueous solution is basified with aqueous sodium hydroxide and extracted with methylene chloride. The organic extracts are washed with water, dried (sodium sulfate) and the solvent removed. A buff solid, 21.05 g, remains which is dissolved in chloroform and flushed through a 600 g column of neutral, activity III alumina. Recrystallization (ethyl acetate) of the yellow solid isolated from the chloroform eluates affords 14.02 g crude product, m.p. 197°–199°. A 400 mg portion is recrystallized from ethyl acetate to yield 326 mg title compound, m.p. 198.0°–200.5°, $\lambda_{max}^{KBr}$ 3.30, 5.99 $\mu$. NMR (CDCl$_3$): $\delta$1.08 (triplet, J=7 Hz, —CH$_2$CH$_3$), 4.62 (multiplet, C-5, proton) ppm.

Treating 2.55 g of the above base (m.p. 197°–199°) in 30 ml dry THF with 1.16 g maleic acid in 15 ml. dry THF and diluting the resulting solution with 200 ml ether gives a salt that is twice crystallized (ethyl acetate) to afford 2.30 g of title compound, as the 1:1 maleate salt, dec. 143°–145°.

Although the title product may be isolated from the initial brown, foamy gum, the yield is increased by treating this material with isopropanolic hydrogen chloride-isopropanol.

EXAMPLE VI

11b-Ethyl-2,3,5,6,11,11b-Hexahydro-1H-Pyrido[3',2':4,5]Pyrrolo[3,2-g]Indolizine

To a refluxing suspension of 2.89 g lithium aluminum hydride in 75 ml dry THF is added a solution of 9.72 g 11b-ethyl-1,2,5,6,11,11b-hexahydro-3H-pyrido[3',2':4,5]pyrrolo[3,2-g]indol-3-One in 125 ml dry THF. After stirring and refluxing for 2 hours, the reaction mixture is cooled and carefully decomposed with 15 ml N NaOH and filtered. The solids are thoroughly washed with warm THF and the organic fractions are freed of solvent. A residue remians which is dissolved in dilute aqueous HCl, washed with ether reprecipitated with excess aqueous sodium hydroxide. The precipitate is extracted into methylene chloride, washed with water and dried (sodium sulfate). Removal of solvent affords 8.73 g off-white solid. A 6.89 g portion of this material is chromatographically purified on an 150 g column of neutral, activity III alumina. From the 1/9, 1/4, and 1/1 chloroform-benzene eluates and the early chloroform eluates are isolated 5.97 g of crude product, m.p. 208°–211°. Two recrystallizations of a 3.0 g portion of the product from ethyl acetate provide 2.53 g title compound, m.p. 209°–211°, $\lambda_{max}^{KBR}$ 3.30 $\mu$.

| Analysis for | $C_{15}H_{19}N_3$: | |
|---|---|---|
| Calculated: | C, 74.65; | H, 7.94; N, 17.41. |
| Found: | C, 74.52; | H, 8.06; N, 17.74. |

One gram of the above base (m.p. 208°–211°) in acetone is treated with excess isopropanolic hydrogen chloride and then with ether. The white solid that separates is recrystallized from methanol-acetone to provide a salt, dec. 218°–248°, which, based on elemental analyses, contains 0.5 molecule of water and 1.9 molecule of hydrogen chloride per molecule of title base, dec. 218°–248° $\lambda_{max}^{KBr}$ 3.00, 4.08 μ.

EXAMPLE VII

11b-Ethyl-2,3,5,6,11,11b-Hexahldro-11-Methyl-1H-Pyrido[3',2':4,5]Pyrrolo[3,2-g]Indolizine Methylation of 5.31 g 11b-ethyl-2,3,5,6,11,11b-hexahydro-1H-pyrido[3',2':4,5-pyrrolo[3,2-g]indolizine in 100 ml dry DMF with 1.06 g ca. 50% sodium hydride-mineral oil dispersion and 3.44 g methyl iodide in a manner similar to that of Example III, Method 2, yields, from the methylene chloride extracts of the basic aqueous solution, 5.26 g crude base as a yellow oil. Chromatographic purification of the amine on an 150 g column of neutral, activity III alumina provides, from the benzene eluates, 4.81 g title compound as a pale pink oil, NMR (CDCl$_3$): δ0.99 (triplet J=7 Hz, —CH$_2$CH$_3$), 3.85 (singlet, 11-methyl) ppm.

A 4.38 g quantity of the above base, dissolved in 100 ml acetone, is treated with excess isopropanolic hydrogen chloride. Recrystallization (thrice) of the salt thus formed from methanol-acetone yields 2.72 g title compound as the dihydrochloride salt, dec. 263°–265° (softens 250°).

EXAMPLE VIII 2,3,6,7,12,12b-Hexahydro-12b-Methyl-Pyrido[3',2':4,5]Pyrrolo[2,3-a]Quinolizin-4(1H)-One A solution of 7-azatryptamine (3.2 g), 2-oxo-6-methyl-2,3-dihydropyran[2.4 g, b.p. 50°–54°/1.5 mm., F. Shiroyan, et al. Arm. Khim. Zh., 1967, 649; C.A., 69, 987 (1968)] amd 68 ml THF is refluxed 2 hours, concentrated to a volume of ca. 35 ml, cooled and diluted with 100 ml ether. The solid that separates is recrystallized from benzene to give 2.4 g 5-oxo-N-[2-(1H-pyrrolo[2,3-b]pyridin-3-yl)ethyl]hexanamide, m.p. 114°, $\lambda_{max}^{KBr}$ 3.04, 3.27, 5.83, 6.12 μ. NMR (CDCl$_3$): δ2.02 (singlet, —COCH$_3$), 6.30 (multiplet, amide NH, exchangeable) ppm.

Isopropanol (450 ml), 35.0 g of 5-oxo-N-[2-(1H-pyrrolo [2,3-b]pyridin-3-yl)ethyl]hexanamide and 70 ml ca. 2.57 N isopropanolic hydrogen chloride are refluxed together for 4 hours. After concentration to a volume of ca. 270 ml and chilling at −10° overnight, the light tan solid is collected and dried to provide 30.3 g crude salt, m.p. >300°. A 3.5 g portion of this material is recrystallized from ethanol, thus yielding 2.8 g title compound as the hydrochloride salt, m.p. >300°, $\lambda_{max}^{KBr}$ 3.33 sh, 3.72 br, 6.12 μ; NMR (d$_6$DMSO and D$_2$O): δ1.80 (singlet, 12b-methyl), 5.02 (multiplet, C-6 proton) ppm.

A 300 mg portion of the above salt in water is basified with excess sodium hydroxide. The base is extracted into methylene chloride, washed with water, dried (sodium sulfate) and the solvent is evaporated. A cream-colored residue remains, m.p. 222°–4°, which is recrystallized from ethyl acetate to afford 192 mg title compound, m.p. 234°–237°.

EXAMPLE IX 1,2,3,4,6,7,12,12b-Octahydro-12b-Methylpyrido[3',2':4,5]Pyrrolo[2,3-a]Quinolizine Reduction of 5.0 g 1,2,3,4,6,7,12,12b-octahydro-12b-methylpyrido[3',2':4,5]pyrrolo[2,3-a]quinolizin-4(1H)-one with 2.0 g lithium aluminum hydride and 350 ml dry THF in a manner similar to that of Example II, Method 2 yields, from the tetrahydrofuran fraction, 5.1 g (108%) of crude product, m.p. 156°–158°. A 4.5 g portion of the product in methanol-ether is treated with excess isopropanolic hydrogen chloride. Successive recrystallizations of the salt from isopropanol, methanol-ether, nitromethane and methanol-acetone (twice) produce 1.2 g title compound as the dihydrochloride salt, bearing 0.5 molecule of water per molecule of dihydrochloride, melting range 215°–245°.

A 400 mg portion of crude product (m.p. 156°–158°) is recrystallized from ether to give 0.25 g title compound, m.p. 161°–162°, $\lambda_{max}^{KBr}$ 3.25 br μ.

Analysis for C$_{15}$H$_{19}$N$_3$:
Calculated: C, 74.65; H, 7.94; N, 17.41.
Found: C, 74.57; H, 8.13; N, 17.22.

EXAMPLE X 1,2,3,4,6,7,12,12b-Octahydro-12,12b-Dimethylpyrido[3',2':4,5]Pyrrolo[2,3-a]Quinolizine Methylation of 2.4 g 2,3,6,7,12,12b-hexahydro-12b-methylpyrido[3',2':4,5]pyrrolo[2,3-a]quinolizine (2.4 g) in 40 ml dry DMF with 0.53 g ca. 50% sodium hydride-mineral oil dispersion and 1.44 g methyl iodide is conducted in a manner similar to that of Example III, Method 2. Benzene extracts of the basic aqueous fraction are washed with brine and placed on a 75 g column of neutral, activity III alumina. Elution of the chromatography column with 3/25 ether-benzene produces 2.0 g of the title compound as an oil, NMR (CDCl$_3$): δ1.49 (singlet, 12b-methyl), 3.96 (12-methyl) ppm.

A 1.9 g portion of the above base is treated with excess isopropanolic hydrogen chloride. Recrystallization of the salt thus formed from ethanol yields 1.7 g title compound as the dihydrochloride salt, dec. 288°.

EXAMPLE XI 2,3,6,7,12,12b-Hexahydro-12,12b-Dimethylpyrido[3',2':4,5]Pyrrolo[2,3-a]Quinolizin-4(1H)-One A solution of 2.5 g 2,3,6,7,12,12b-hexahydro-12b-methylpyrido[3',2':4,5]pyrrolo[2,3-a]quinolizin-4(1H)-one in 36 ml dry DMF is methylated with 0.53 g ca. 50% sodium hydride-mineral oil dispersion and 1.42 g methyl iodide in a manner similar to that of Example III, Method 1. Benzene extracts of the basic aqueous fraction, after washing with brine and drying (magnesium sulfate) are placed on a 75 g column of neutral, activity III alumina. Development of the column with 3/20 etherbenzene yields 1.2 g title compound, m.p. 159°–160°.

Treating 1.1 g of the above base in ether with excess isopropanolic hydrogen chloride produces a salt which is recrystallized from nitromethane to afford 0.7 g of the title compound as the dihydrochloride salt, m.p. 253°, $\lambda_{max}^{KBr}$ 4.54, 6.11, sh, 6.15 μ; NMR (dDMSO): δ1.78 (singlet, 12b-methyl), 4.11 (singlet, 12-methyl), 4.95 (multiplet, C-6 proton) ppm.

EXAMPLE XII 1,2,3,6,7,8a-Hexahydro-8a-Methylindolizin-8(5H)-One

Toluene (200 ml), 4.1 g sodium methoxide and 16.0 g 2-carboxy-2-methyl-1-pyrrolidinebutyric acid, dimethyl ester are refluxed 3 hours. The mixture is extracted with water and the combined aqueous extracts are adjusted to pH 1 with concentrated HCl. After heating 3 hours at ca. 100°, the acidic solution gives a positive ferric chloride test. Therefore heating is continued 10 hours longer whereupon a negative test is attained. The solution is evaporated to a small volume and treated with excess sodium carbonate and ether. The ether phase is separated and the residue is triturated thoroughly with ether. After drying (MgSO₄), the combined ethereal fractions are freed of solvent and the residual oil is distilled to afford 4.4 g 1,2,3,6,7,8a-hexahydro-8a-methylindolizin-8(5H)-One, b.p. 115°–119°/22 mm; $\lambda_{max}^{film}$ 5.83μ; NMR (CDCl₃): δ0.95 (singlet, 8a-methyl) ppm.

EXAMPLE XIII 2,3,5,6,11,11b-Hexahydro-11b-Methyl-11Propyl-1H-Pyrido[3',2':4,5]Pyrrolo[3,2-g]Indolizine Propylation of 6.82 g 2,3,5,6,11,11b-hexahydro-11b-methyl-1H-pyrido[3',2':4,5]pyrrolo[3,2-g]indolizine in ca. 100 ml dry DMF with 1.59 g 50% sodium hydride-mineral oil dispersion and 7.07 g n-propyl p-toluenesulfonate in a manner similar to that of Example III, Method 2, yields, from the benzene extracts of the basic, aqueous fraction, 7.2 g crude product. Purification of the product on a 240 g column of alumina (neutral, activity III) affords, from the benzene eluates, 4.99 g title compound as a pale-pink gum, NMR (CDCl₃): δ1.03 (triplet, J=7 Hz, —CH₂CH₃), 1.58 (singlet, 11b-methyl) and 4.17 (multiplet, 11-methylene) ppm.

The above base, in acetone, is treated with excess isopropanolic hydrogen chloride. Two crystallizations of the salt thus formed from methanol-acetone give 2.99 g title compound as the dihydrochloride salt, solvated with one-third molecule of water per molecule of dihydrochloride, dec. 232.5°–239.5° (softens 227°), $\lambda_{max}^{KBr}$ 2.95, 4.22, 4.40, 6.15 μ.

EXAMPLE XIV

11-Allyl-2,3,5,6,11,11b-Hexahydro-11b-Methyl-1H-Pyrido[3',2':4,5]Pyrrolo[3,2-g]Indolizine Allylation of 2,3,5,6,11,11b-hexahydro-11b-methyl-1H-pyrido[3',2':4,5]pyrrolo[3,2-g]indolizine (5.69 g) in ca. 100 ml dry DMF with 1.32 g ca. 50% sodium hydride-mineral oil dispersion and 3.33 g allyl bromide in a manner similar to that of Example III, Method 2, affords, from the methylene chloride extracts of the basic, aqueous fraction, 5.61 g gummy amine which are purified on a 200 g column of alumina (neutral, activity III alumina). From the 1:1 benzene-hexane and benzene eluates are isolated 3.03 g title compound as a gum, $\lambda_{max}^{film}$ 6.13, 10.94μ; NMR (CDCl₃): δ1.55 (singlet, 11b-methyl), 4.95 (multiplet, 11-N—CH₂— and —CH=CH₂ protons) and 6.05 (multiplet, 11-N—CH₂CH=CH₂ proton) ppm.

Treating 2.83 g of the above base in acetone with excess isopropanolic hydrogen chloride yields a salt which is recrystallized (twice) from ethanol to provide 2.12 g title compound as the dihydrochloride salt, solvated with one-third molecule of water per molecule of dihydrochloride, dec. 239°–242° (softens 230°), $\lambda_{max}^{KBr}$ 2.93, 6.11, 10.60 μ.

EXAMPLE XV 11,11b-Diethyl-2,3,5,6,11,11b-Hexahydro-1H-Pyrido[3',2':4,5]Pyrrolo[3,2-g]Indolizine Ethylation of 11-ethyl-2,3,5,6,11,11b-hexahydro-1H-pyrido[3',2':4,5]pyrrolo[3,2-g]indolizine (5.31 g) in ca. 110 ml dry DMF with 1.16 g ca. 50% sodium hydride-mineral oil dispersion and 3.77 g ethyl iodide according to the general procedure of Example III, Method 2, yields, from the benzene extracts of the basic, aqueous fraction, a yellow oil which is purified on a 200 g column of neutral, activity III alumina. From the benzene eluates are isolated 4.81 g of crude product as a pale-pink solid, m.p. 80.0°–83.5°.

A 500 mg portion of the crude product is distilled at 92°–99°/10⁻³ mm. to yield 438 mg white title compound, m.p. 80.5°–83.0°, NMR (CDCl₃): δ0.98 (triplet, J=7 Hz, 11b-CH₂CH₃), 1.45 (triplet, J=7 Hz, —N—CH₂CH₃ protons) and 4.28 (multiplet, 11-methylene) ppm.

Treating 4.17 g of the crude product (m.p. 80.0°–83.5°) in acetone with excess isopropanolic hydrogen chloride and recrystallization (twice) of the resulting salt from methanolacetone afford 3.43 g of the title compound as the dihydrochloride, dec. 237°–242° (softens 215°).

EXAMPLE XVI

11b-Ethyl-1,2,5,6,11,11b-Hexahydro-11-Methyl-3H-Pyrido[3',2':4,5]Pyrrolo[3,2-g]Indolizin-3-One In a manner similar to that described in Example III, Method 1, 11b-ethyl-1,2,5,6,11,11b-hexahydro-3H-pyrido[3',2':4,5]pyrrolo[3,2-g]indolizin-3-one (2.04 g) in ca. 60 ml dry DMF is methylated with 0.42 g 50% sodium hydride-mineral oil dispersion and 1.25 g methyl iodide. Benzene extracts of the basic, aqueous fraction are washed with water and with brine and dried (sodium sulfate). Removal of the solvent affords 2.00 g yellow gum which is purified on a 70 g. alumina (neutral, activity III) column. From the 1/4 and 1/1 chloroform-benzene eluates are isolated 1.77 g title compound as a colorless glass, $\lambda_{max}^{KBr}$ 5.96μ; NMR (CDCl₃): δ0.98 (triplet, J=7 Hz, 11b-CH₂CH₃), 3.83 (singlet, 11-methyl) and 4.50 (multiplet C-5 proton) ppm.

Treating the above base (1.63 g) with excess isopropanolic hydrogen chloride gives a salt which, upon recrystallization (twice) from methylene chloride-acetone provides 1.18 g title compound as the hydrochloride salt, dec. 264°–267°.

EXAMPLE XVII

12-Ethyl-1,2,3,4,6,7,12,12b-Octahydro-12b-Methylpyrido[3',2':4,5]Pyrrolo[2,3-a]Quinolizine Ethylation of 2.41 g 1,2,3,4,6,7,12,12b-octahydro-12b-methylpyrido[3',2':4,5]pyrrolo[2,3-a]quinolizine in 36 ml dry DMF with 0.53 g sodium hydride-mineral oil dispersion and 1.7 g ethyl iodide in 5 ml dry DMF is conducted in a manner similar to that of Example III, Method 2. Benzene extracts of the basic, aqueous fraction are washed with brine and placed on an 80 g column of neutral, activity III alumina. From the benzene eluates are isolated 1.6 g of the title compound, m.p. 80°, NMR (CDCl$_3$): δ1.45 (singlet, 12b-methyl) and 430 (multiplet, 12 N—C$\underline{H}_2$—) ppm.

An 1.5 g quantity of the above base is converted to the hydrochloride salt which, after recrystallization from acetonitrile, affords 0.8 g title compound as the dihydrochloride salt, m.p. 232°–234°.

EXAMPLE XVIII

12-Allyl-1,2,3,4,6,7,12,12b-Octahydro-12b-Methylpyrido[3',2':4,5]Pyrrolo[2,3-a]Quinolizine Employing a procedure similar to that of Example III, Method 2, 4.5 g 1,2,3,4,6,7,12,12b-octahydro-12-methylpyrido [3',2':4,5]pyrrolo[2,3-a]quinolizine in 70 ml dry DMF are reacted with 0.98 g 50% sodium hydride-mineral oil dispersion and 2.37 g allyl bromide in 5 ml dry DMF. Chloroform extracts of the basic, aqueous solution are washed with brine, dried (magnesium sulfate) and freed of solvent. Chromatographic purification of the residue on an 150 g column of neutral, activity III alumina yields, from the benzene eluates, 2.9 g title compound as a gum, NMR (CDCl$_3$): δ1.48 (singlet, 12b-methyl), 5.02 (multiplet, N—CH$_2$— and —CH=C$\underline{H}_2$), 6.02 (multiplet), N—CH$_2$C$\underline{H}$=CH$_2$) ppm.

Conversion of 2.8 g of the above base to the hydrochloride salt and recrystallization of the crude salt from methanolacetone give 1.6 g of the title compound as the dihydrochloride salt, solvated with one-fourth molecule of water per molecule of salt, m.p. 233°–5° $\delta_{max}^{KBr}$ 2.95, 6.13, 10.65μ.

EXAMPLE XIX 1,2,5,6,11,11b-Hexahydro-11b-Propyl-3H-Pyrido[3',2':4,5]Pyrrolo[3,2-g]Indolizin-3-One Butyl cellosolve (500 ml), 40.32 g 7-azatryptamine and 38.92 g 4- oxoheptanoic acid [See U.S. Pat. No. 2,577,133, (C.A. 46, 6147h), also T.M. Patrick, *J. Org. Chem.*, 17, 1009 (1952)] are reacted and purified in the manner described in Example V. The product (47.9 g) isolated after chromatography is recrystallized from ethyl acetate to yield 37.55 g title compound, m.p. 180.5°–184.0°, $\lambda_{max}^{KBr}$ 3.12, 5.98μ, NMR (CDCl$_3$): δ0.90 (triplet, J=6 Hz, 11b-CH$_2$C$\underline{H}_3$), 4.55 (multiplet, C-5 proton) ppm.

A solution of 4.04 g of the above base in dry THF is added to 1.74 g fumaric acid in the same solvent. Subsequent addition of ether and chilling afford a salt which is recrystallized from ethyl acetate (twice) and from ethyl acetate-ether to provide 1.11 g title compound as the mono fumarate salt, dec. 164.5°–167.0°.

EXAMPLE XX 1,2,5,6,11,11b-Hexahydro-11-Methyl-11b-Propyl-3H-Pyrido[3',2':4,5]Pyrrolo[3,2-g]Indolizin-3-One In a manner similar to that given in Example III, Method I, 1,2,5,6,11,11b-hexahydro-11b-propyl-3H-pyrido[3',2':4,5]pyrrolo[3,2-g]indolizin-3-one (8.08 g) in 75 ml dry DMF is methylated with 1.58 g 50% sodium hydride-mineral oil dispersion and 4.68 g methyl iodide. Benzene extracts of the basic aqueous solution are washed with water and with brine and dried (sodium sulfate). The gum (8.5 g) remaining after removal of the solvent is chromatographically purified on 250 g neutral, activity III alumina. From the 1/4 chloroform-benzene and 1/1 chloroform-benzene eluates are isolated 6.70 g title compound as a colorless gum. $\lambda_{max}^{CHCl_3}$ 6.02μ; NMR (CDCl$_3$): δ0.94 (triplet, J=6 Hz, 11b-CH$_2$C$\underline{H}_3$), 3.85 (singlet, 11-methyl), 4.53 (multiplet, C-5 proton) ppm.

Treating the above base (6.6 g) in ether with excess isopropanolic hydrogen chloride gives a salt which, upon recrystallization (twice) from methylene chloride-acetone affords 5.11 g title compound as the hydrochloride salt, dec. 253°–6° (softens 220°).

EXAMPLE XXI 2,3,5,6,11,11b-Hexahydro-11b-Propyl-1H-Pyrido[3',2':4,5]Pyrrolo[3,2-g]Indolizine Reduction of 21.55 g 1,2,5,6,11,11b-hexahydro-11b-propyl-3H-pyrido[3',2':4,5]pyrrolo[3,2-g]indolizin-3-one with 6.07 g lithium aluminum hydride and 250 ml dry THF is conducted in a manner similar to that of Example VI. The solid isolated from the methylene chloride extracts is recrystallized from ethyl acetate, thereby affording 16.8 g title compound, m.p. 146.0°–148.5°, NMR (CDCl$_3$): δ0.87 (triplet, J=6 Hz, 11b-CH$_2$C$\underline{H}_3$) ppm.

A 5.11 g portion of the above base in dry THF is treated with excess isopropanolic hydrogen chloride and then with acetone. Two recrystallizations of the salt thus formed from methanol-acetone yield the title compound as the dihydrochloride, 1.35 g dec. 251°–261° (softens 235°).

EXAMPLE XXII 2,3,5,6,11,11b-Hexahydro-11-Methyl-11b-Propyl-1H-Pyrido[3',2':4,5]Pyrrolo[3,2-g]Indolizine Methylation of 2,3,5,6,11,11b-hexahydro-11b-propyl-1H-pyrido[3',2':4,5]pyrrolo[3,2-g]indolizine (7.66 g) in 125 ml dry DMF with 1.59 g 50% sodium hydride-mineral oil dispersion and 4.68 g methyl iodide is carried out in a manner similar to that of Example III, Method 2. From the benzene extracts of the basic, aqueous fraction are isolated 6.65 g brown gum which is placed on a 350 g column of neutral, activity III alumina. Removal of solvent from the 1:1 benzene-chloroform eluates gives 6.22 g crude title compound as a colorless gum, NMR (CDCl$_3$): δ0.87 (triplet, J=6 Hz, 11b-CH$_2$C$\underline{H}_3$), 3.80 (singlet, 11-methyl) ppm.

A 6.12 g portion of the above base in ether is treated with excess isopropanolic hydrogen chloride. Recrystallization (thrice) of the salt thus formed from methanol-acetone and from methanol-ether (small amount of HCl gas added to insure complete salt formation) provides 2.28 g title compound as the dihydrochloride, dec. 247°–252° (softens 238°).

EXAMPLE XXIII

11-Butyl-2,3,5,6,11,11b-Hexahydro-11b-Methyl-1H-Pyrido[3',2':4,5]Pyrrolo[3,2-g]Indolizine Butylation of 5.69 g 2,3,5,6,11,11b-hexahydro-11b-methyl-1H-pyrido[3',2':4,5]pyrrolo[3,2-g]indolizine in 100 ml dry DMF with 1.32 g ca. 50% sodium hydride-mineral oil dispersion and 3.75 g 1-bromobutane is conducted in a manner similar to that of Example III, Method 2. From the benzene extracts of the basic, aqueous fraction are isolated a crude base (6.37 g) which is purified on a 200 g column of neutral, activity III alumina. The gum (3.41 g) eluted with benzene is distilled to provide 2.71 g title compound as a viscous, pale yellow oil, b.p. 137-8/10⁻³ mm; NMR (CDCl₃): δ1.00 (triplet, J=7 Hz, —CH₂CH₃)), 1.58 (singlet, 11b-methyl), 4.24 (multiplet, 11-methylene) ppm.

A 2.14 g portion of the above base in acetone is treated with isopropanolic hydrogen chloride followed by addition of ether. Recrystallization (twice) of the salt thus formed from methylene chloride-acetone yields 0.63 g title compound as the dihydrochloride salt, dec. 235°–239° (softens 210°).

EXAMPLE XXIV 2,3,5,6,11,11b-Hexahydro-11-Isoamyl-11b-Methyl-1H-Pyrido[3′,2′:4,5]Pyrrolo[3,2-g]Indolizine Alkylation of 6.82 g 2,3,5,6,11,11b-hexahydro-11b-methyl-1H-pyrido[3′,2′:4,5]pyrrolo[3,2-g]indolizine in 100 ml dry DMF with 1.59 g 50% sodium hydride-mineral oil dispersion and 6.54 g 1-iodo-3-methylbutane in a manner similar to that of Example III, Method 2 affords, from the benzene extracts of the basic aqueous fraction, 8.4 g crude base. Purification of this amine on a 250 g column of neutral, activity III alumina gives, from the benzene eluates 5.05 g title compound as a pink gum, NMR (CDCl₃): δ1.01 (doublet, J=6 Hz,

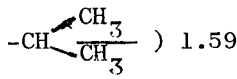 ) 1.59

(singlet, 11b-methyl), 4.23 (multiplet, 11-methylene) ppm.

Dissolution of 4.77 g of the above base in acetone, addition of excess isopropanolic hydrogen chloride and subsequent treatment with ether provide a salt that is twice recrystallized from 2 propanol. A final recrystallization from acetonitrile gives 2.84 title compound as the dihydrochloride salt solvated with two-thirds of a molecule of water per molecule of dihydrochloride, dec. 197°–206° (softens 182°) λ$_{max}^{KBr}$ 2.93, 4.01μ.

EXAMPLE XXV l-2,3,5,6,11,11b-Hexahydro-11,11b-Dimethyl-1H-Pyrido[3′,2′:4,5]Pyrrolo[3,2-g]Indolizine Dihydrochloride A solution of 56.45 g. 2,3-dibenzoyl-2(R):3(R)-tartaric acid monohydrate [[α]$_D^{25}$ −114.7° (c, 1.028, methanol)] in 200 ml warm (50°) methanol is treated with a solution of 36.20 g 2,3,5,6,11,11b-hexahydro-11,11b-dimethyl-1H-pyrodo[3′,2′:4,5]pyrrolo [3,2-g]indolizine in 100 ml warm (50°) methanol. After seeding, the mixture is kept at ca. 25° for 4 hours and at +8° for 16 hours. The product is collected and thrice recrystallized from methanol to afford 29.59 g (66%) l-2,3,5,6,11,11b-hexahydro-11,11-b-dimethyl-1H-pyrido[3′,2′,:4,5]pyrrolo[3,2-g]indolizine, 2,3-dibenzoyl-2(R):3(R)-tartrate (1:1), dec. 175.5°–177.0°, [α]$_D^{25}$ −97.5°(c, 1.006, DMF).

The preceding salt, 27.77 g. suspended in 0.25 l. water, is treated with 10 ml 50% w/w aqueous sodium hydroxide and the amine is extracted into ether. After successive washings with water and with brine, the ethereal solution is dried over sodium sulfate. Removal of solvent gives 10.67 g (95%) l- 2,3,5,6,11,11b-hexahydro-11,11b-dimethyl-1H-pyrido[3′,2′:4,5]pyrrolo [3,2-g]indolizine as a barely yellow, viscous oil, [α]$_D^{26}$ −115.8° (c, 0.9605, methanol).

Dissolution of 10.42 g of the preceding oily base in 150 ml absolute ethanol and addition of 40 ml 2.48 N isopropanolic hydrogen chloride provide a salt. Two recrystallizations of the salt from methanol-acetone yield 11.26 g. (83%) title compound as a white solid, dec. 306.5°–8.0°, [α]$_D^{26}$ −82.6° (c, 0.971, methanol).

EXAMPLE XXVI d-2,3,5,6,11,11b-Hexahydro-11,11b-Dimethyl-1H-Pyrido[3′,2′:4,5]Pyrrolo[3,2-g]Indolizine, Dihydrochloride The residue isolated upon evaporation of the methanolic mother liquor from which the crude levo isomer separated (see Example XXV) is shaken with 400 ml water — 20 ml 50% w/w aqueous sodium hydroxide and the liberated base is extracted into ether. After washing with water, with brine and drying (sodium sulfate), the solvent is evaporated to provide a brown oil. To remove any non-basic contaminants, the oil is dissolved in 200 ml N hydrochloric acid and the acidic solution is washed thoroughly with ether. Basification of the acidic solution is followed by extraction with ether and the ethereal extract is washed with water and with brine. After drying of the ethereal solution (sodium sulfate) and removal of solvent 17.84 g crude dextro base are isolated as a brown gum, [α]$_D^{25}$+89.00° (c, 1.002, methanol).

This gum (17.64 g) in 50 ml methanol is added to a warm (~50°) solution of 27.51 g 2,3-dibenzoyl-2(S):3(S)-tartaric acid monohydrate ([α]$_D^{25}$+ 115.7° (c, 1.025, methanol)) in 90 ml methanol. After seeding, the mixture is kept at +5° for 22 hours. The salt is collected and thrice recrystallized from methanol, with washing with small amounts of cold methanol and with ether after each recrystallization, to produce 27.06 g (60%) d-2,3,5,6,11,11b-hexahydro-11,11b-dimethyl-1H-pyrido[3′,2′4,5]pyrrolo[3,2-g]indolizine, 2,3-dibenzoyl-2(S):3(S)-tartrate (1:1), dec. 176°–7°, [α]$_D^{25}$+99.0 (c, 1.026, DMF).

Conversion of 25.34 g of preceding salt to the free base is carried out in the same manner as for the levo isomer (see Example XXV) thereby yielding 9.74 g (96%) d-2,3,5,6,11,11b-hexahydro-11,11b-dimethyl-1H-pyrido[3′,2′:4,5]pyrrolo[3,2-g]indolizine as a barely yellow, viscous oil, [α]$_D$ +115.5° (c, 0.992, methanol).

A 9.49 g portion of the preceding base in 150 ml absolute ethanol is treated with 35 ml 2.48 N isopropanolic hydrogen chloride. The solid that forms is collected and twice recrystallized from methanol-acetone to afford 9.97 g (81%) title compound, dec. 306.5°–8.0°, [α]$_D^{26}$+82.4° (c, 1.061, methanol).

EXAMPLE XXVII 2,3,5,6,11,11b-Hexahydro-11,11b-Dimethyl-1H-Pyrido [3′,2′:4,5]Pyrrolo[3,2-g]Indolizine a. Methylhydrazine (36.8 g) and 12.8 g 2-brompoyridine are refluxed for 6 hours and then the reaction solution is concentrated at 50° (in vacuo) to an oil, is mixed with ice and is basified with 50% w/w aqueous sodium hydroxide. The mixture is extracted with ether and the extract is washed with brine and dried (MgSO₄). Removal of the ether and distillation of the residue gives 4.9 g N-methyl-N-)2-pyridyl) hydrazine, b.p. 74°–6°/3mm, NMR (CDCl₃): δ3.25 (singlet, N—CH₃)ppm.

G. Palazzo and L. Baiocchi [*Ann. Chim.* (Rome), 55, 935 (1965); C.A. 63, 16335h (1965)] prepared N-methyl-N-(2-pyridyl) hydrazine by methylation of 2-hydrazinopyridine with methyl iodide and sodium hydride, b.p. 68°/0.5 mm.

b. Employing a reflux period for 5 hours, 146.1 g 2-carboxy-2-methyl-1-pyrrolidinebutyric acid, dimethyl ester and 35.7 g sodium methoxide in 1.5 liter toluene are reacted as in Example XII. After heating at ca 100° for 20 hours, the acidic aqueous solution is evaporated to dryness and the residue is extracted into methanol and is filtered to remove insolubles. The extract is freed of solvent and the residue is redissolved in methanol (200 ml), filtered, and the filtrate is concentrated to a volume of ca. 150 ml. Addition of 450 ml acetone and chilling (+5°) afford, after thorough drying, 58.2 g 1,2,-3,6,7,8a-hexahydro-8a-methylindolizin-8(5H)-one, hydrochloride, m.p. 199°–201°, $\lambda_{max}^{KBr}$ 4.02, 5.77 μ; NMR (d₆-DMSO): δ1.64 (singlet, 8a-methyl) ppm.

c. Absolute ethanol (25ml), 2,5g N-methyl-N-(2-pyridyl)hydrazine (see part (a) above) and 3.8 g 1,2,3,-6,7,8a-hexahydro-8-a-methylindolizin-8(5H)-one, hydrochloride are heated on the steam bath and the solution is adjusted to pH ca. 1 with isopropanolic hydrogen chloride. The solution then is heated on the steam bath with evaporation of the solvent and the gummy residue is dissolved in water. Basification of the aqueous solution with aqueous sodium hydroxide is followed by extraction of the mixture with chloroform. The organic extracts are washed with brine, dried (MgSO₄) and freed of solvent to give a liquid residue. Distillation of this material at 158°/3.10⁻³mm affords 3.8 g 1,2,3,6,7,8a-methylindolizin-8(5H-one, N-methyl-N-(2-pyridyl)hydrazone, NMR (CDCl₃): δ1.33 (singlet, C-Me), 3.17 (singlet, N-methyl) ppm.

d. A solution of 0.5 g 1,2,3,6,7,8a-hexahydro-8a-methylindolizin-8(5H-one, N-methyl-N-pyridyl hydrazone in 7 ml diphenyl ether is refluxed for 30 minutes, cooled, diluted with ether and extracted with dilute aqueous hydrochloric acid. The acidic extract, after washing with ether, is basified with concentrated sodium hydroxide and the mixture is extracted with chloroform. After washing with brine and drying (MgSO₄), the chloroform solution is freed of solvent and the residue is chromatographed on 12 g of neutral, activity III alumina. From the benzene eluates are isolated 108 mg gum which is dissolved in ether and treated with excess isopropanolic hydrogen chloride. The solid thus formed is triturated with ether and thoroughly dried to provide 85 mg of salt, dec. 301°–4° (softens 298°) which is shown to be the title compound, dihydrochloride, by melting point, mixture melting point, thin-layer chromatographic, IR and NMR spectral comparisons with the product of Example III, Method 1.

EXAMPLE XXVIII 1,2,5,6,11,11b-hexahydro-11b-Methyl-3H-Pyrido[3',2':4,5]Pyrrolo[3,2-g]Indolizin-3-Thione Dimethoxyethane (100 ml), 2.4 g phosphorus pentasulfide and 2.4 g 1,2,5,6,11,11b-hexahydro-11b-methyl-3H-pyrido [3',2':4,5]pyrrolo[3,2-g]indolizin-3-one are refluxed 4 hours. After cooling, dilute aqueous ammonium hydroxide is added, the reaction mixture is extracted with chloroform and the organic solution is washed with dilute aqueous ammonium hydroxide, with brine and is dried (MgSO₄). Passage of the dried chloroform solution through a 100 g column of neutral, activity III alumina and further elution with chloroform provide 2.3 g solid. Recrystallization of this material from methylene chlorideacetone yields 0.8 g title compound, dec. 299°–300°.

| Analysis for | C₁₄H₁₅N₃S: | | | |
|---|---|---|---|---|
| Calculated: | C, 65.34; | H, 5.88; | N, 16.33; | S, 12.46. |
| Found: | C, 64.98; | H, 6.09; | N, 16.05; | S, 12.51. |

Exposure of 0.7 g of the above product in methylene chloride to excess isopropanolic hydrogen chloride, followed by the addition of ether yields a salt which is recrystallized from methanol-acetone to give 0.6 g title compound as the hydrochloride, dec. 300° (softens 285°).

EXAMPLE XXIX 2,3,5,6,11,11b-Hexahydro-11b-Methyl-1H-Pyrido [3',2':4,5]Pyrrolo[3,2-g]Indolizine Refluxing of 1.2 g 1,2,5,6,11,11b-hexahydro-11b-methyl-3H-pyrido[3',2':4,5]pyrrolo[3,2-g]indolizin-3-thione in 150 ml absolute ethanol with 15 g (wet weight) of Raney nickel (Grace Co. No. 28, previously slurried wit distilled water and then with absolute ethanol) for 2 hours is followed by filtration and washing of the insolubles with 100 ml hot ethanol. The ethanolic filtrates and washings are combined, freed of solvent and the residue is dissolved in dilute aqueous hydrochloric acid and is washed with ether. Basification of the acidic solution is followed by ether extraction and the extracts are washed with brine and dried (magnesium sulfate). Evaporation of the solvent yields 0.6 g solid which is flushed through a 20 g column of neutral, activity III alumina with chloroform. The solid isolated from the chloroform eluates is recrystallized from methylene chloride-ether to provide 0.2 g solid, m.p. 290°. Removal of solvent from methylene chloride-ether crystallization mother liquor gives a solid that is recrystallized (twice) from ether. The compound thus isolated, m.p. 196.5° is shown to be the title amine by melting point, mixture melting point, and IR and NMR spectral comparisons with the product of Example II, Method 1.

The conditions employed in Examples XXVII and XXIX are similar to those described in U.S. Pat. No. 3,454,583.

EXAMPLE XXX 2,3,5,6,11,11b-Hexahydro-11,11b-Dimethyl-1H-Pyrido [3',2':4,5]Pyrrolo[3,2-g]Indolizine 4-Oxide A solution of 2.41 g 2,3,5,6,11,11b-hexahydro-11,11b-dimethyl-1H-pyrido[3',2':4,5]pyrrolo[3,2-g]indolizine in 25 ml dry THF is stirred and kept at 0° while a solution of 1.73 g m-chloroperoxybenzoic acid in 25 ml dry THF is added dropwise (5 minutes). After stirring 0.5 hour at 0°, 9.0 ml of 2.3 N isopropanolic hydrogen chloride are added and stirring is continued for 0.5 hour. Acetone (20 ml) is added to aid filerability and the product is collected, washed with acetone and dried. Two recrystallizations of the crude product from methanol provide 1.7 g title compound, as the dihydrochloride, dec. 270°–278°.

EXAMPLE XXXI

11-Amyl-2,3,5,6,11,11b-Hexahydro-11b-Methyl-1H-Pyrido [3',2':4,5]Pyrrolo[3,2-g]Indolizine In a manner similar to that of Example III, Method 2, 6.82 g 2,3,5,6,11,11b-hexahydro-11b-methyl-1H-pyrido[3',2': 4,5]pyrrolo[3,2-g]indolizine in 100 ml dry DMF is reacted with 1.59 g 50% sodium hydride-mineral oil dispersion and 4.99 g 1-bromopentane. From the benzene extracts of the basic, aqueous solution are isolated 8.2 g viscous yellow gum which is chromatographically purified on a 250 g column of neutral, activity III alumina. Removal of solvent from the benzene eluates provides 4.75 g title compound, as a pale pink gum, NMR (CDCl$_3$): δ0.93 (triplet, —CH$_2$CH$_3$), 1.63 (singlet, 11b-methyl), 4.25 (multiplet, 11-methylene) ppm.

Treating a solution of 4.60 g of the above base in acetone with excess isopropanolic hydrogen chloride followed by the addition of ether gives a salt which is recrystallized (twice) from methylene chloride-acetone to yield 3.04 g title compound as the dihydrochloride salt solvated with one-fourth of a molecule of water per molecule of dihydrochloride, dec. 194°–199°, $\lambda_{max}^{KBr}$ 2.92, 4.15μ.

EXAMPLE XXXII

The analgesic activity of the compounds of Formula Ia and Ib can be elicited and demonstrated in rats by employing the following procedure:

Groups of at least five rats are used. Each rat is positioned so that a high intensity light beam shines on the tip of the tail. The intensity of the beam is adjusted so that a rat will react to the heat so produced by moving his tail out of the beam in 3 to 8 seconds. The average of 3 measurements taken 10 minutes apart serves as a control. The test compound is then administered, and the reaction times are measured every 30 minutes for a 2 hour period. Post drug reaction time is compared to that of the control average by statistical analysis. Analgesic activity is indicated by the ability of the compound to prolong the reaction time. The ED$_{50}$ is defined as the dose of test material sufficient to cause 50% of the test animals to exhibit a positive response. When utilized in the above-described procedure, 2,3,5,6,11,11b-hexahydro-11,11b-dimethyl-1H-pyrido[3',2':4,5]pyrrolo[3,2-g]indolizine, as the dihydrochloride, exhibited an ED$_{50}$ of 0.09 mg/kg (P.O.) and 0.12 mg/kg (I.M.); 2,3,5,6,11,11 b-hexahydro,11b-methyl-1H-pyrido[3',2':4,5]pyrrolo[3,2-g]indolizine, dihydrochloride, exhibited an ED$_{50}$ of 6 mg/kg (P.O.) and 4.75 mg/kg (I.M.). In this test, morphine exhibits and ED$_{50}$ of 10 mg/kg (P.O.) and, 2.0 mg/kg (I.M.).

The following compounds showed analgesic activity by intraperitoneal administration (with no deaths observed) at the following dosages:

| Compound of[a] Example | Dosage (mg/kg) I.P. | Response[b] |
|---|---|---|
| II | 12.5 | 3/5 |
| III | 0.032 | 6/10 |
| IV | 0.78 | 5/10 |
| VI | 6.25 | 4/5 |
| VII | 6.25 | 5/5 |
| XIII | 6.25 | 5/5 |
| IX | 3.12 | 5/10 |
| X | 3.12 | 8/10 |
| XIV | 1.56 | 5/5 |
| XV | 6.25 | 5/5 |
| XVII | 6.25 | 10/10 |
| XVIII | 3.12 | 9/10 |
| XXI | 12.5 | 2/6 |
| XXII | 25 | 6/6 |
| XXIII | 6.25 | 5/5 |
| XXIV | 6.25 | 5/6 |
| XXVI | 0.078 | 4/6 |
| XXV | 6.25 | 3/6, 4/6 |
| XXX | 1.56 | 10/10 |
|  | 0.39 | 8/10 |
| XXXI | 6.25 | 2/6 |

[a] Compounds were tested as the salts described in the indicated examples
[b] Number of rats showing positive response / Total number of rats in test group By the I.P. route, the ED$_{50}$ of morphine is 3.5 mg/kg.

EXAMPLE XXXIII

An injectable solution is prepared from the following formulation:

| | |
|---|---|
| 2,3,5,6,11,11b-hexahydro-11, 11b-dimethyl-1H-pyrido[3',2':4,5]pyrrolo [3,2-g]indolizine, dihydrochloride | 50 mg. |
| Sodium acetate, anhydrous | 60.15 mg. |
| Phenol | 50 mg. |
| Glacial acetic acid | q.s. to pH 5 |
| Water for Injection | q.s. to 50 ml. |

The phenol and sodium acetate are dissolved in 40 ml. of the water. The active ingredient is then dissolved in the solution. The pH of the solution is adjusted with glacial acetic acid. Water for injection is finally added to make a 50 ml. solution. The solution, containing 1 mg/ml of medicament, is subjected to sterile filtration and filled asceptically into sterile vials or ampules.

EXAMPLE XXXIV

Tablets for oral use are prepared with the following formulation:

| | | |
|---|---|---|
| 2,3,5,6,11,11b-hexahydro-11,11b-dimethyl-1H-pyrido[3',2':4,5] pyrrolo[3,2-g]indolizine, dihydrochloride | 0.5 | mg. |
| microcrystalline cellulose, N.F. | 30.0 | mg. |
| magnesium stearate, U.S.P. | 0.3 | mg. |
| Amberlite, IRP 88 | 1.0 | mg. |
| Lactose | 68.2 | mg. |
| | 100.0 | mg. |

The ingredients are mixed, milled, re-mixed, and compressed into tablets containing 0.5 mg of active ingredient.

What is claimed is:

1. A compound of the formulae:

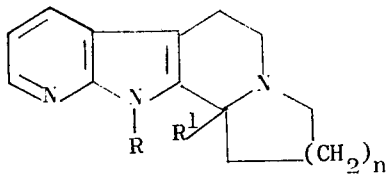

and

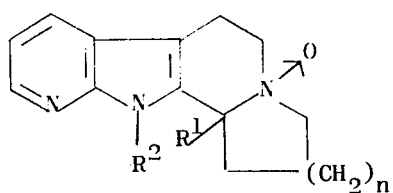

wherein R is hydrogen, alkyl of from 1 to 5 carbon atoms, or allyl; R¹ is methyl, ethyl, or n-propyl; R² is alkyl of from 1 to 5 carbon atoms or allyl; and n is 1 or 2; and the pharmacologically acceptable acid addition salts thereof.

2. A compound as defined in claim 1 of the formula

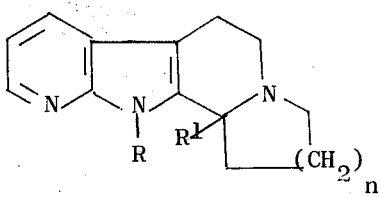

wherein R is hydrogen, alkyl of from 1 to 5 carbon atoms, or allyl; R¹ is methyl, ethyl, or n-propyl; and n is 1 or 2; and the pharmacologically acceptable acid addition salts thereof.

3. The compound as defined in claim 2 which is 2,3,-5,6,11,11b-hexahydro-11,11b-dimethyl-1H-pyrido[3',2':4,5]pyrrolo[3,2-g]indolizine.

4. The compound as defined in claim 2 which is d-2,3,5,6,11,11b-hexahydro-11,11b-dimethyl-1H-pyrido[3',2':4,5]pyrrolo[3,2-g]indolizine.

5. The compound as defined in claim 2 which is l-2,3,5,6,11,11b-hexahydro-11,11b-dimethyl-1H-pyrido[3',2':4,5]pyrrolo[3,2-g]indolizine.

6. The compound as defined in claim 2 which is 2,3,-5,6,11,11b-hexahydro-11b-methyl-1H-pyrido[3',2':4,5]pyrrolo[3,2-g]indolizine.

7. The compound as defined in claim 2 which is 11-ethyl-2,3,5,6,11,11b-hexahydro-11b-methyl-1H-pyrido3',2':4,5]-pyrrolo[1H-pyrido[-g]indolizine.

8. The compound as defined in claim 2 which is 11b-ethyl-2,3,5,6,11,11b-hexahydro-1H-pyrido[3'.2':4,5]pyrrolo[3,2-g]indolizines.

9. The compound as defined in claim 2 which is 11b-ethyl-2,3,5,6,11,11b-hexahydro-11-methyl-1H-pyrido[3',2':4,5]-pyrrolo[3,2-g]indolizine.

10. The compound as defined in claim 2 which is 1,2,-,3,4,6,7,12,12b-octahydro-12b-methylpyrido[3',2':4,5]pyrrolo[2,3-a]quinolizine.

11. The compound as defined in claim 2 which is 1,2,-,3,4,6,7,12,12b-octahydro-12,12b-dimethylpyrido[3',2':4,5]pyrrolo[2,3-a]quinolizine.

12. The compound as defined in claim 2 which is 11,-11b-diethyl-2,3,5,6,11,11b-hexahydro-1H-pyrido[3',2':4,5]pyrrolo[3,2-g]indolizine.

13. The compound as defined in claim 2 which is 2,3-,5,6,11,11b-hexahydro-11b-methyl-11-propyl-1H-pyrido[3',2':4,5]pyrrolo[3,2-g]indolizine.

14. The compound as defined in claim 2 which is 11-allyl-2,3,5,6,11,11b-hexahydro-11b-methyl-1H-pyrido[3',2':4,5]-pyrrolo[3,2-g]indolizine.

15. The compound as defined in claim 2 which is 12-ethyl-1,2,3,4,6,7,12,12b-octahydro-12b-methylpyrido[3',2':4,5]-pyrrolo[2,3-a]quinolizine.

16. The compound as defined in claim 2 which is 12-allyl-1,2,3,4,6,7,12,12b-octahydro-12b-methylpyrido[3',2':4,5'']-pyrrolo[2,3-a]quinolizine.

17. The compound as defined in claim 2, which is 2,-3,5,6,11,11b-hexahydro-11b-propyl-1H-pyrido[3',2':4,5]-pyrrolo[3,2-g]indolizine.

18. The compound as defined in claim 2, which is 2,-3,5,6,11,11b-hexahydro-11-methyl-11b-propyl-1H-pyrido[3',2':4,5]pyrrolo[3,2-g]indolizine.

19. The compound as defined in claim 2, which is 11-butyl-2,3,5,6,11,11b-hexahydro-11b-methyl-1H-pyrido[3',2': 4,5]pyrrolo[3,2-g]indolizine.

20. The compound as defined in claim 2, which is 2,-3,5,6,11,11b-hexahydro-11-isoamyl-11b-methyl-1H-pyrido[3',2':4,5]pyrrolo[3,2-g]indolizine.

21. The compound as defined in claim 2 which is 11-amyl-2,3,5,6,11,11b-hexahydro-11b-methyl-1H-pyrido[3',2':4,5]pyrrolo[3,2-g]indolizine.

22. A compound of the formula:

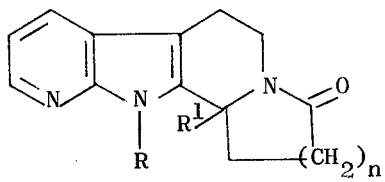

wherein R is hydrogen or lower alkyl; R¹ is lower alkyl; and n is 1 or 2; and the acid addition salts thereof.

23. The compound as defined in claim 22 which is 1,-2,5,6,11,11b-hexahydro-11b-methyl-3H-pyrido[3',2':4,5]pyrrolo[3,2-g]indolizin-3-one.

24. The compound as defined in claim 22 which is 1,-2,5,6,11,11b-hexahydro-11,11b-dimethyl-3H-pyrido[3',2':4,5]pyrrolo[3,2-g]indolizin-3-one.

25. The compound as defined in claim 22 which is 1-1b-ethyl-1,2,5,6,11,11b-hexahydro-3H-pyrido[3',2':4,5]pyrrolo[3,2-g]indolizin-3-one.

26. The compound as defined in claim 22 which is 1-1b-ethyl-1,2,5,6,11,11b-hexahydro-11-methyl-3H-pyrido[3',2':4,5]pyrrolo[3,2-g]indolizin-3-one.

27. The compound as defined in claim 22 which is 2,-3,6,7,12,12b-hexahydro-12b-methylpyrido[3',2':4,5]pyrrolo[2,3-a]-quinolizin-4(1H)-one.

28. The compound as defined in claim 22 which is 2,-3,6,7,12,12b-hexahydro-12,12b-dimethylpyrido[3',2':4,5]pyrrolo[2,3-a]quinolizin-4(1H)-one.

29. The compound as defined in claim 22 which is 1,-2,5,6,11,11b-hexahydro-11b-propyl-3H-pyrido[3',2':4,5]pyrrolo[3,2-g]indolizin-3-one.

30. The compound as defined in claim 22 which is 1,-2,5,6,11,11b-hexahydro-11-methyl-11b-propyl-3H-pyrido[3',2': 4,5]pyrrolo[3,2,-g]indolizin-3-one.

31. A compound as defined in claim 1 of the formula:

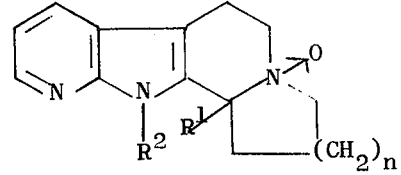

wherein R¹ is methyl, ethyl, or n-propyl; R² is alkyl of from 1 to 5 carbon atoms and allyl; and n is 1 or 2; and the pharmacologically acceptable acid addition salts thereof.

32. The compound as defined in claim 31, which is 2,3,5,6,11,11b-hexahydro-11,11b-dimethyl-1H-pyrido[3′,2′:4,5]pyrrolo[3,2-g]indolizino 4-oxide.

33. The compound as defined in claim 1 which is 2,3,5,6,11,11b-hexahydro-11,11b-dimethyl-1H-pyrido[3′,2′:4,5]-pyrrolo[3,2,-g]indolizine, dihydrochloride.

34. The compound as defined in claim 31 which is 2,3,5,6,11,11b-hexahydro-11,11b-dimethyl-1H-pyrido[3′,2′:4,5]-pyrrolo[3,2-g]indolizino 4-oxide, dihydrochloride.

* * * * *